US011886760B2

(12) United States Patent
Zhang et al.

(10) Patent No.: US 11,886,760 B2
(45) Date of Patent: Jan. 30, 2024

(54) PRINT DRIVER STORE FOR REDIRECTION PRINTING IN A VIRTUALIZED COMPUTING ENVIRONMENT

(71) Applicant: VMware, Inc., Palo Alto, CA (US)

(72) Inventors: Hui Zhang, Beijing (CN); Weigang Huang, Beijing (CN); Kun Shi, Beijing (CN); Mangui She, Beijing (CN); Hui Yuan, Beijing (CN); Gang Si, Beijing (CN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/184,603

(22) Filed: Feb. 25, 2021

(65) Prior Publication Data

US 2022/0222019 A1 Jul. 14, 2022

(30) Foreign Application Priority Data

Jan. 8, 2021 (WO) ................ PCT/CN2021/070788

(51) Int. Cl.
*G06F 3/12* (2006.01)
*G06F 9/451* (2018.01)
*G06F 9/455* (2018.01)

(52) U.S. Cl.
CPC .......... *G06F 3/1225* (2013.01); *G06F 3/1203* (2013.01); *G06F 3/123* (2013.01); *G06F 3/1284* (2013.01); *G06F 9/452* (2018.02); *G06F 9/45541* (2013.01); *G06F 9/45545* (2013.01)

(58) Field of Classification Search
CPC ...... G06F 3/1225; G06F 3/1203; G06F 3/123; G06F 3/1284; G06F 9/452; G06F 9/45545; G06F 9/45541
See application file for complete search history.

(56) References Cited

U.S. PATENT DOCUMENTS

| 10,795,616 | B1* | 10/2020 | Zhang | G06F 3/1289 |
|---|---|---|---|---|
| 2003/0084132 | A1* | 5/2003 | Ohta | G06F 9/4411 |
| | | | | 713/1 |
| 2003/0135668 | A1* | 7/2003 | Abe | G06F 9/4411 |
| | | | | 710/15 |
| 2003/0200289 | A1* | 10/2003 | Kemp | G06F 3/1285 |
| | | | | 709/221 |
| 2004/0006766 | A1* | 1/2004 | Kim | G06F 9/4411 |
| | | | | 717/174 |
| 2004/0034862 | A1* | 2/2004 | Kadota | G06F 9/4411 |
| | | | | 719/321 |

(Continued)

*Primary Examiner* — Huo Long Chen
(74) *Attorney, Agent, or Firm* — King Intellectual Asset Management

(57) ABSTRACT

A print driver store is usable for redirection printing in a virtualized computing environment that supports virtual desktops. Native print drivers are uploaded to the print driver store from a client side. When an agent attempts to instantiate a virtual printer at the agent side that corresponds to a physical printer at the client side, the agent checks to determine if a native print driver for the physical printer is installed at the agent side. If the native print driver is not installed, then the agent obtains the native print driver from the print driver store and installs the native print driver at the agent side. The agent completes the instantiation of the virtual printer at the agent side and associates the native print driver with the virtual printer.

21 Claims, 5 Drawing Sheets

(56) References Cited

U.S. PATENT DOCUMENTS

| | | | |
|---|---|---|---|
| 2007/0300220 A1* | 12/2007 | Seliger | H04L 63/0272 718/1 |
| 2009/0007151 A1* | 1/2009 | Sheehan | G06F 3/1203 719/321 |
| 2011/0251851 A1* | 10/2011 | Van Lierde | G06Q 10/10 705/2 |
| 2012/0092693 A1* | 4/2012 | Jaudon | G06F 3/122 358/1.13 |
| 2013/0222827 A1* | 8/2013 | Watanabe | G06F 3/122 358/1.13 |
| 2013/0318522 A1* | 11/2013 | Devireddy | H04L 12/6418 718/1 |
| 2014/0013234 A1* | 1/2014 | Beveridge | G06F 3/0488 715/740 |
| 2014/0233050 A1* | 8/2014 | Kishida | G06F 3/1284 358/1.13 |
| 2017/0228201 A1* | 8/2017 | Taylor | G06F 9/4411 |

* cited by examiner

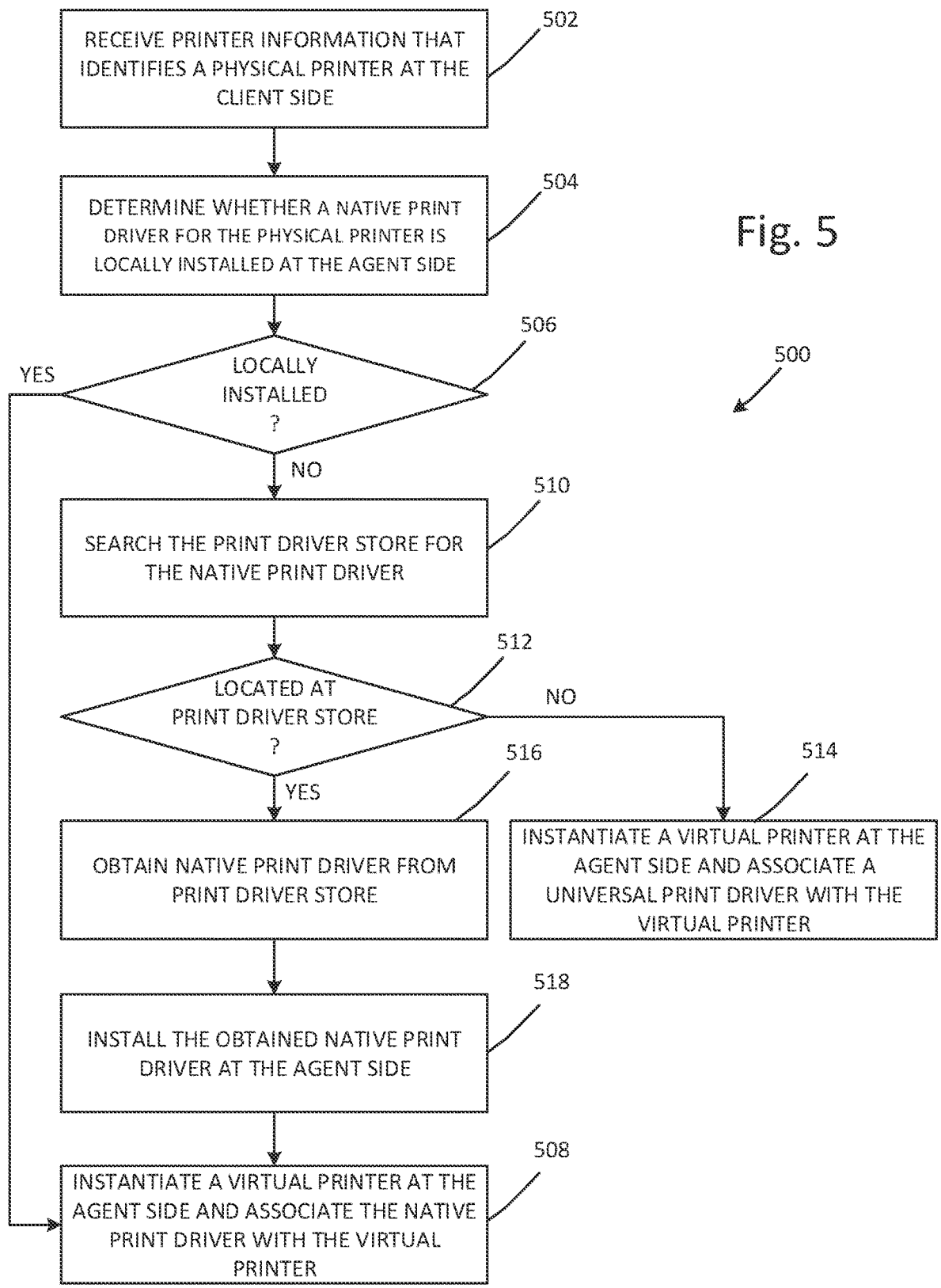

PRINT DRIVER STORE FOR REDIRECTION PRINTING IN A VIRTUALIZED COMPUTING ENVIRONMENT

CROSS-REFERENCE TO RELATED APPLICATION

The present application claims the benefit of Patent Cooperation Treaty (PCT) Application No. PCT/CN2021/070788, filed Jan. 8, 2021. The PCT application is herein incorporated by reference in its entirety.

BACKGROUND

Unless otherwise indicated herein, the approaches described in this section are not admitted to be prior art by inclusion in this section.

Virtualization allows the abstraction and pooling of hardware resources to support virtual machines in a software-defined networking (SDN) environment, such as a software-defined data center (SDDC). For example, through server virtualization, virtualized computing instances such as virtual machines (VMs) running different operating systems (OSs) may be supported by the same physical machine (e.g., referred to as a host). Each virtual machine is generally provisioned with virtual resources to run an operating system and applications. The virtual resources in a virtualized computing environment may include central processing unit (CPU) resources, memory resources, storage resources, network resources, etc.

One example use of a virtualized computing environment is for a virtual desktop infrastructure (VDI) implementation, which is a type of desktop virtualization that allows a desktop to run on a VM that is provided by a hypervisor on a host. A user/client uses the operating system (OS) and applications (which reside and execute at the VM) via an endpoint device of the user, just as if the OS/applications were actually running locally on the endpoint device.

VDI implementations provide the user with printing capability, so that the user can issue print jobs from the virtual desktop at the VM, and then the printing is performed at a physical printer that is connected to the user's endpoint device (client device). However, printing in a virtualized computing environment (such as one that is implementing VDI) is prone to problems due to unavailability, incompatibility, and/or other limitations related to print drivers. Such problems may result in failed print jobs, poorer quality printer output, printing inefficiencies, and/or other adverse printing-related issues.

BRIEF DESCRIPTION OF DRAWINGS

FIG. 5 is flowchart of an example method to use a print driver store to provide print drivers to an agent associated with a virtual desktop at an agent side of the virtualized computing environment of FIG. 1.

DETAILED DESCRIPTION

Figure 1:
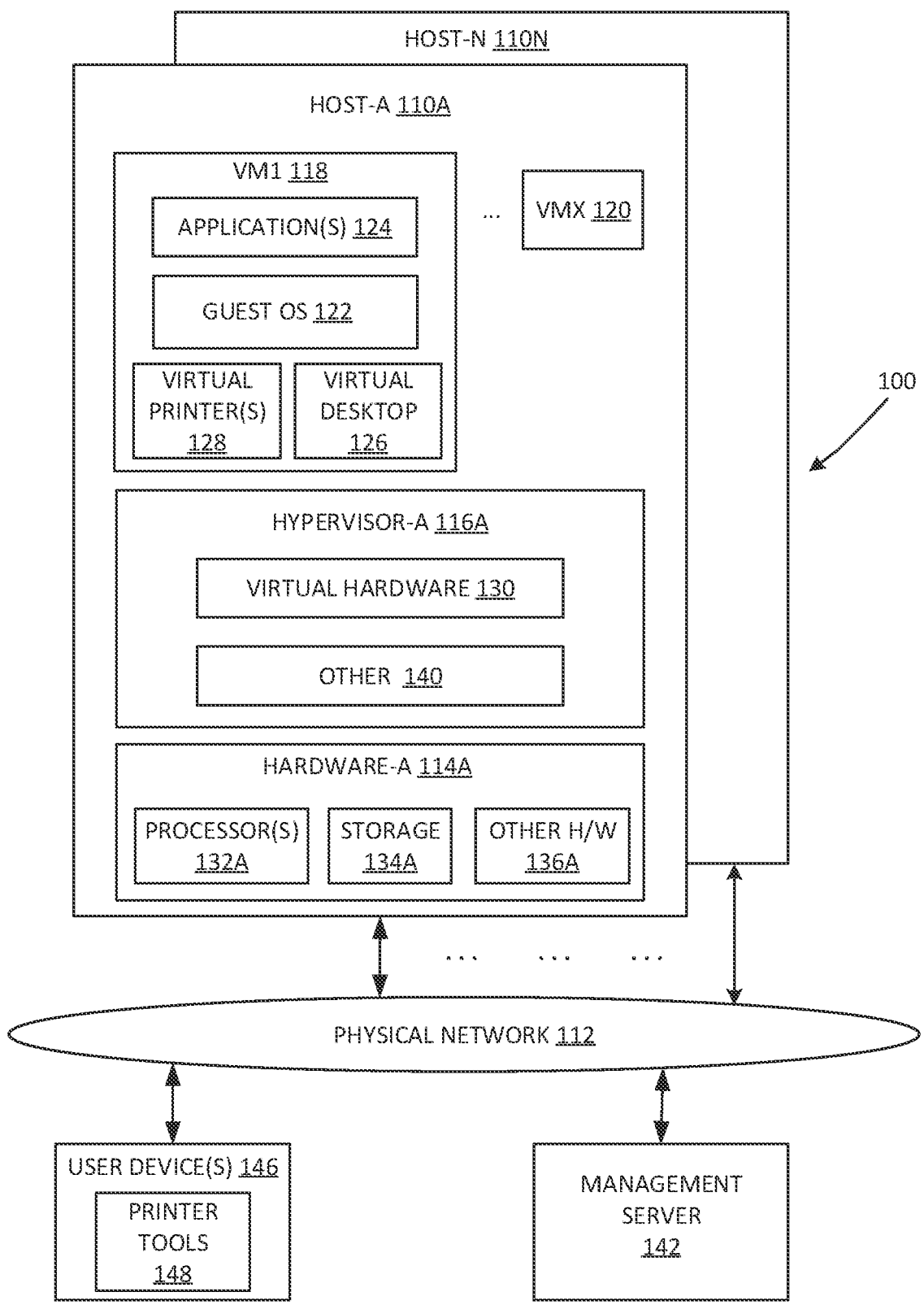
FIG. 1 is a schematic diagram illustrating an example virtualized computing environment that can implement a VDI with printing capability.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. The aspects of the present disclosure, as generally described herein, and illustrated in the drawings, can be arranged, substituted, combined, and designed in a wide variety of different configurations, all of which are explicitly contemplated herein.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be effected in connection with other embodiments whether or not explicitly described.

The present disclosure addresses at least the above-described drawbacks that are encountered when attempting to perform redirection printing in a virtualized computing environment that supports a virtual desktop infrastructure (VDI). The methods/devices/systems described herein increase the availability of native print drivers for use in print jobs that are issued from a virtual desktop at the agent side. Native print drivers are uploaded to the print driver store from the client side. When a VDI session is established between the client and the agent, the agent obtains printer information from the client that corresponds to physical printers at the client side. Based on the printer information, agent attempts to instantiate virtual printers at the agent side that correspond to the physical printers at the client side.

The agent determines if native print drivers (associated with the physical printers) are locally installed at the agent side. If the native print drivers are not locally installed at the agent side, then the agent searches the print driver store for the native print drivers. If located, the agent obtains the native print drivers from the print driver store and locally installs these native print drivers at the agent side. The agent completes the instantiation of the virtual printers at the agent side and associates the native print drivers (obtained from the print driver store) with the virtual printers. In this manner, native print drivers become more readily available for printing use by the agent.

Computing Environment

To further explain the details of the use of a print driver store to provide native print drivers in a virtual desktop infrastructure (VDI) or to other type of virtual desktop environments, reference is first made herein to FIG. 1, which is a schematic diagram illustrating an example virtualized computing environment 100 that can implement VDI with printing capability. Depending on the desired implementation, virtualized computing environment 100 may include additional and/or alternative components than that shown in FIG. 1.

In the example in FIG. 1, the virtualized computing environment 100 includes multiple hosts, such as host-A 110A . . . host-N 110N that may be inter-connected via a physical network 112, such as represented in FIG. 1 by interconnecting arrows between the physical network 112 and host-A 110A . . . host-N 110N. Examples of the physical network 112 can include a wired network, a wireless network, the Internet, or other network types and also combinations of different networks and network types. For simplicity of explanation, the various components and features of the hosts will be described hereinafter in the context of the host-A 110A. Each of the other host-N 110N can include substantially similar elements and features.

The host-A 110A includes suitable hardware 114A and virtualization software (e.g., a hypervisor-A 116A) to support various virtual machines (VMs). For example, the host-A 110A supports VM1 118 . . . VMX 120. In practice, the virtualized computing environment 100 may include any number of hosts (also known as a computing devices, host computers, host devices, physical servers, server systems, physical machines, etc.), wherein each host may be supporting tens or hundreds of virtual machines. For the sake of simplicity, the details of only the single VM1 118 are shown and described herein.

VM1 118 may be an agent-side VM that includes a guest operating system (OS) 122 and one or more guest applications 124 (and their corresponding processes) that run on top of the guest OS 122. Using the guest OS 122 and/or other resources of VM1 118 and the host-A 110A, VM1 118 may generate a virtual desktop 126 that is operated by and accessible to one or more client-side user device(s) 146 via the physical network 112. One or more virtual printers 128 may be instantiated in VM1 118 and/or elsewhere in the host-A 110A. VM1 118 may include other elements, such as code and related data (including data structures), engines, etc., which will not be explained herein in further detail, for the sake of brevity. The user device 146 may include printer tools 148 (explained in more detail in FIG. 2) to support print jobs at physical printers that are locally connected to the user device 146.

The hypervisor-A 116A may be a software layer or component that supports the execution of multiple virtualized computing instances. The hypervisor-A 116A may run on top of a host operating system (not shown) of the host-A 110A or may run directly on hardware 114A. The hypervisor 116A maintains a mapping between underlying hardware 114A and virtual resources (depicted as virtual hardware 130) allocated to VM1 118 and the other VMs. The hypervisor-A 116A and/or other components of the host-A 110A (such as VMs) may include other elements (shown generally at 140), including tools to support print jobs that are issued by VM1 118 to the virtual printers 128 and various other tools to provide resources for and to otherwise support the operation of the VMs. Such tools may include, for example, one or more print drivers in some implementations.

Hardware 114A in turn includes suitable physical components, such as central processing unit(s) (CPU(s)) or processor(s) 132A; storage device(s) 134A; and other hardware 136A such as physical network interface controllers (NICs), storage disk(s) accessible via storage controller(s), etc. Virtual resources (e.g., the virtual hardware 130) are allocated to each virtual machine to support a guest operating system (OS) and application(s) in the virtual machine, such as the guest OS 122 and the application(s) 124 (e.g., a word processing application, accounting software, a browser, etc.) in VM1 118. Corresponding to the hardware 114A, the virtual hardware 130 may include a virtual CPU, a virtual memory (including agent-side caches used for print jobs for the virtual printers 128), a virtual disk, a virtual network interface controller (VNIC), etc.

A management server 142 (usable by a system administrator, for example) of one embodiment can take the form of a physical computer with functionality to manage or otherwise control the operation of host-A 110A . . . host-N 110N. In some embodiments, the functionality of the management server 142 can be implemented in a virtual appliance, for example in the form of a single-purpose VM that may be run on one of the hosts in a cluster or on a host that is not in the cluster.

The management server 142 may be communicatively coupled to host-A 110A . . . host-N 110N (and hence communicatively coupled to the virtual machines, hypervisors, hardware, etc.) via the physical network 112. In some embodiments, the functionality of the management server 142 may be implemented in any of host-A 110A . . . host-N 110N, instead of being provided as a separate standalone device such as depicted in FIG. 1.

Depending on various implementations, one or more of the physical network 112, the management server 142, and the user device(s) 146 can comprise parts of the virtualized computing environment 100, or one or more of these elements can be external to the virtualized computing environment 100 and configured to be communicatively coupled to the virtualized computing environment 100.

Printer Redirection Using Print Drivers and a Print Driver Store

Figure 2:
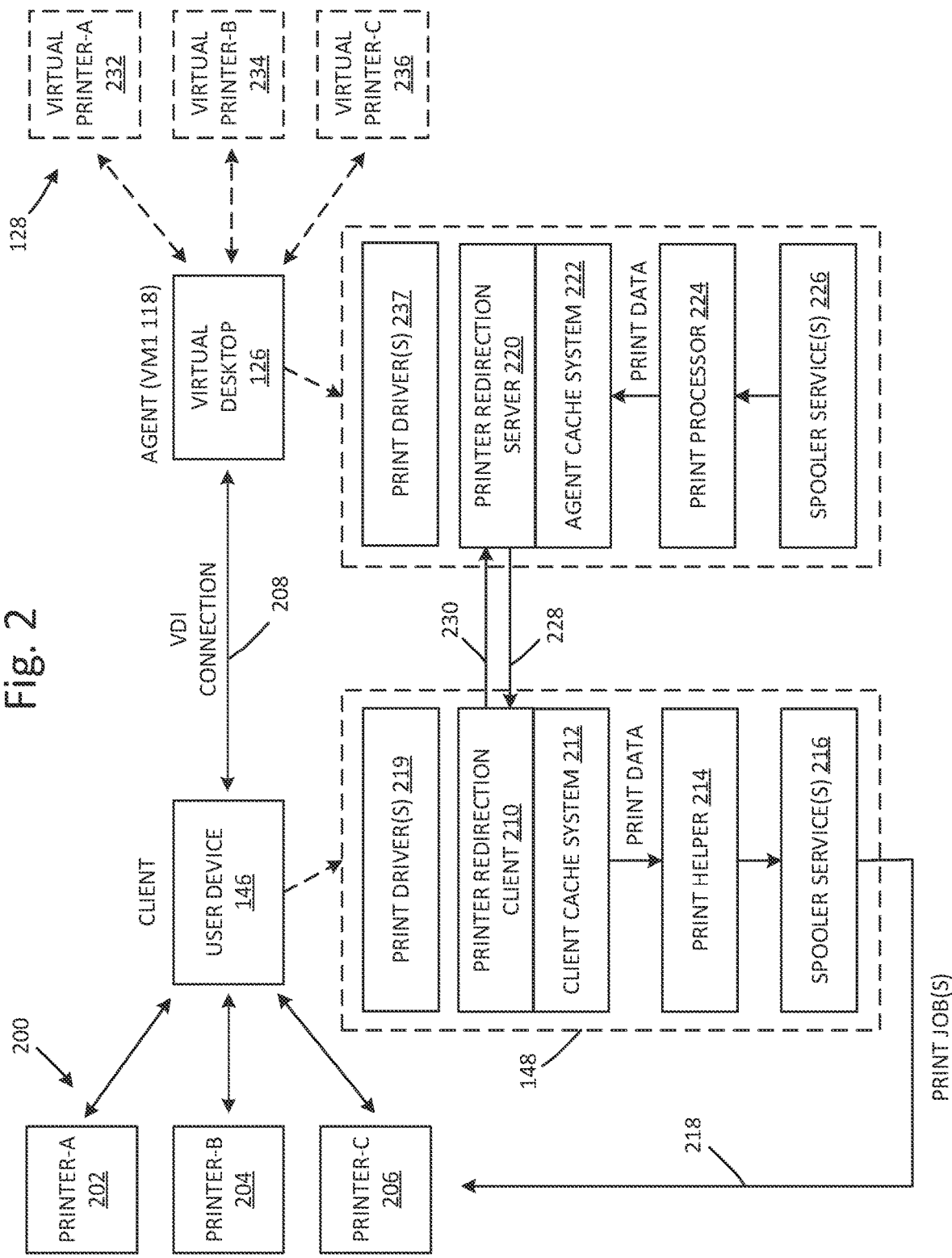
FIG. 2 is a diagram illustrating client and agent devices and printers for the virtualized computing environment of FIG. 1.

FIG. 2 is a diagram illustrating client and agent devices and printers for the virtualized computing environment 100 of FIG. 1. More specifically, FIG. 2 shows the client (e.g., the user device 146), the agent (e.g., the VM1 118 that provides the virtual desktop 126), and their associated elements and printers that execute print jobs.

At the client side, the user device 146 is connected (via a network, universal serial bus (USB), or other wired/wireless connection) to a plurality of physical printers 200. The physical printers 200 include, for instance, a printer-A 202, a printer-B 204, and a printer-C 206. The user device 146 access, operates, or otherwise communicates with the virtual desktop 126 running on VM1 118 at the agent side, via a VDI connection 208 provided by the physical network 112.

The printer tools 148 of the user device 146 may include a printer redirection client 210 along with a client cache system 212 as a sub-component. The printer tools 148 may also include a print helper 214 and spooler service(s) 216 that operate in conjunction with the printer redirection client 210 and the client cache system 212 to prepare and send (shown at 218) print data for print jobs to the printers 200.

The printer tools 148 may further include one or more print drivers 219. For instance, there may be a corresponding print driver 219 for each of printer-A 202, printer-B 204, and printer-C 206. For purposes of explanation, the print driver(s) 219 is shown in FIG. 2 as residing with the other elements 210-216 amongst the printer tools 148—the print driver(s) 219 may be installed in any suitable location (e.g., folder) in the user device 146, such as inside of an operating system of the user device 146, outside of the operating system, as a sub-component of elements 210-216, integrated along with an application, or other location.

Correspondingly installed at the agent side is a printer redirection server 220 along with an agent cache system 222 as a sub-component, a print processor 224, and spooler service(s) 226 that operate in conjunction with the printer redirection server 220 and the agent cache system 222 to prepare and send (shown at 228) print data to the printer redirection client 210 for printing at the printers 200. One or more of the printer redirection server 220, the agent cache system 222, the print processor 224, and the spooler service(s) 226 can reside at VM1 118 or elsewhere in the host-A 110A.

When the VDI connection 208 is established between the client and the agent, information regarding the printers 200 is sent (shown at 230) from the printer redirection client 210 to the printer redirection server 220 via the VDI connection 208. This information is used by the printer redirection server 220 to instantiate the virtual printers 128. Thus, the virtual printers 128 include a virtual printer-A 232, a virtual printer-B 234, and a virtual printer-C 236 that respectively represent the physical printer-A 202, printer-B 204, and printer-C 206.

The agent side may further include one or more print drivers 237. For instance, there may be a corresponding print driver 237 provided for each of virtual printer-A 232, virtual printer-B 234, and virtual printer-C 236. The print driver(s) 237 may be installed in any suitable location (e.g., folder) in the VM1 118 or its host-A 110A, such as inside of the guest OS 122, outside of the guest OS 122, as a sub-component of elements 220-226 (such as part of the print processor 224), integrated along with an application (e.g., the application 124), inside/outside of the host OS, in the hypervisor-A 110, or other location.

In operation, when the virtual desktop 126 issues a print job for one of the virtual printers (for instance, the virtual printer-C 236), the print processor 224 gets the print data from the spooler service(s) 226 and converts the print data to an appropriate format, and sends the print data to the agent cache system 222 so that the printer redirection server 220 can then transfer (at 228) the print data to the printer redirection client 210 at the client side. When the client cache system 212 receives the print data, the client cache system 212 sends the print data to the print helper 214. The print helper 214 will then write, via the spooler service(s) 216, the print data to the printer-C 206 for printing.

With regards to print drivers, the print drivers (e.g., print drivers 219 and 237) are typically pre-installed, and should be the same or compatible between the client side and the agent side. For a situation wherein the client and the agent have different operating systems, even if the client has a particular print driver installed therein, such particular print driver would be useless for the agent side.

For a situation wherein the client and the agent have the same operating system, a particular print driver may be installed at the client—however, the print driver installer kit for that particular print driver may be unavailable. Thus, it would be difficult to install that particular printer at the agent side.

An approach to the above issues is to create a universal print driver (UPD) on the agent side. A UPD enables, for example, printers of different versions or models to work together under a single standardized/common solution. The UPD generates print data, such as enhanced metafile (EMF) data, that is device-independent and so can be printed from any printer version/model. When the user triggers a print job, the agent side generates print data for a selected virtual printer (e.g., one of the virtual printers 232-236) using the UPD, and the generated print data is sent to the client side. At the client side, the client parses or otherwise processes the print data into a format that is recognizable by the physical printer (e.g., one of the printers 202-206 that corresponds to the selected virtual printer) and completes the printing at that physical printer.

One issue with the above use of UPD is that the printer output at the physical printer is not as rich as the printer output that would otherwise be provided by an original print driver, such as a native print driver (NPD) that is part of (or native to) the operating system at the client side. If the agent side happened to have the NPD installed therein, then the print driver at the agent side would be the exactly the same as the print driver at the client side. In this manner, therefore, the user may use the virtual printer at the agent side as if using the physical printer at the client side—raw print data may be sent from the agent side to the client side, and then directly passed to the physical printer.

Thus, the use of NPD is often better than UPD, due to a richer printer output and more efficient printing process. However, since 100% use of NPD is often not possible, UPD and NPD are typically combined together. With such combined print drivers, the printing process first determines whether a NPD is available at the agent side (and if available, uses the NPD); and if the NPD is determined to be unavailable at the agent side, then a UPD is used instead. In another approach, UPD is used first; and if UPD is not available, NPD is used instead (if available). Other approaches involve UPD only or NPD only, such that the print job is failed if the UPD (or NPD) is unavailable. Thus, such foregoing approaches can be categorized as the following options: NPD only, UPD only, NPD over UDP, and UPD over NPD.

Figure 3:
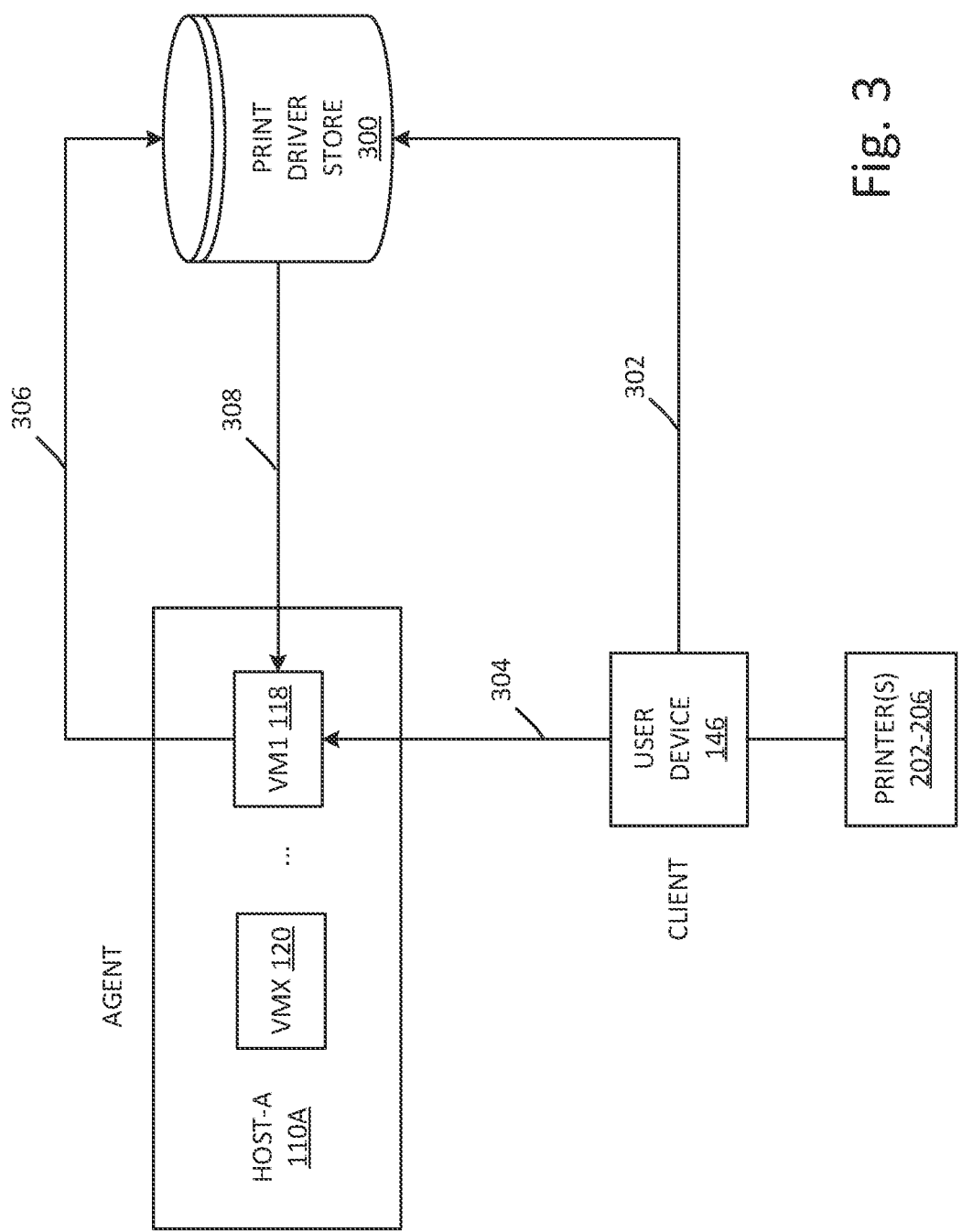
FIG. 3 is a diagram illustrating use of a print driver store in conjunction with the client and agent devices and printers of FIG. 2.

The embodiments described herein increase the availability and use of NPDs. This approach enables the user to take advantage of the richer output and other benefits of NPD as much as possible, rather than using UPD. FIG. 3 illustrates such method in more detail.

Specifically, FIG. 3 is a diagram illustrating use of a print driver store 300 in conjunction with the client and agent devices and printers of FIG. 2. The print driver store 300 may be used by the agent to obtain a print driver (e.g., a native print driver) if the print driver is not already locally installed at the agent side.

The elements shown in FIG. 3 correspond to at least some of the elements shown in FIGS. 1 and 2 (e.g., FIG. 3 is a simplified representation). The print driver store 300 may be comprised of real or virtual storage locations. For instance, the print driver store 300 can comprise one or more dedicated standalone storage devices within or outside of the virtualized computing environment 100; can comprise storage devices 134 from one or more hosts in the virtualized computing environment 100; can comprise part of a private or public cloud storage system; can be one or more virtual storage nodes in a software-defined virtual storage area network (vSAN) in the virtual computing environment 100; etc. For purposes of explanation, only the single host-A 110A and its VMs (e.g., VM1 118) are shown and described in detail herein—similar operations can be performed in other hosts and VMs in the virtualized computing environment 100.

Initially, if one or more print drivers (e.g., a particular NPD) is installed or otherwise available at the client side (e.g., at the user device 146) and such NPD(s) can be used at the agent side (e.g., at a virtual desktop supported by VM1 118), then such NPD(s) can be installed at the agent side using an installation process. For instance, the client and agent may have the same operating system and the installer kit(s) for the NPD(s) may be available. Thus, the client collects the print drivers and extracts the print driver files, compresses the print driver files, and sends the print driver files to the agent. At the agent side, the agent installs the print driver files such that after installation, the NPD(s) are used when the virtual desktop issues a print job to the virtual printer(s) associated with the installed NPD(s).

According to various embodiments, a NPD is only installed once at the agent side, and remains persistent at the agent side unless explicitly deleted by a user or system administrator. With the NPD thus installed at the agent side, a session-based printer (e.g., a virtual printer) compatible with the installed NDP can be created at the agent side when a VDI session between the client and agent is established (e.g., via the VDI connection 208 shown in FIG. 2), and that virtual printer can thus use the NPD when a print job is issued to that virtual printer from the virtual desktop. Also, deleting the virtual printer at the agent side does not affect/delete the installed NPD.

In several situations, it may not be possible or practical to install a native print driver at the agent side from the client side, as described above. Accordingly, the client (user device 146), other clients, the management server 142, and/or other entities/devices may be provided with access to the print driver store 300. The print driver store 300 is configured as a repository for print drivers (e.g., print driver files of NPDs). The client(s) and/or other entities provide print driver files of NPDs to the print driver store 300 for collection/storage therein (shown at 302 in FIG. 3). The stored NPDs may be identified/indexed in the print driver store 300 by, for example, module name (e.g., a printer name or other name provided by the manufacturer/vendor), operating system type, and names of the print driver files.

When a VDI session (e.g., via the VDI connection 208 shown in FIG. 2) is established between the client and the agent, the client provides (shown at 304) printer information to the agent. As previously explained above with respect to FIG. 2, this printer information identifies the physical printers (e.g., printers 202-206 shown in FIGS. 2 and 3) at the client side, and the printer information is used by the agent to attempt instantiation of the virtual printers at the agent side that correspond to the physical printers at the client side.

After receiving the printer information from the client, the agent then checks its local storage to determine whether the NPD(s) of the physical printers have been previously installed at the agent side. If the agent finds such locally installed NPD(s), then the agent instantiates the corresponding virtual printer(s) at the agent side and associates these NPD(s) with the corresponding virtual printer(s), and such virtual printer(s) are thus enabled to receive and process print jobs from the virtual desktop.

However, if the agent is not able to find a locally installed NPD for the printer, then the agent accesses (shown at 306) the print driver store 300. The agent performs a search of the print drivers stored in the print driver store 300, so as to find the NPD(s) for the virtual printers to be instantiated. If the agent locates such NPD(s) in the print driver store 300, then the agent 300 downloads, copies, or otherwise obtains (shown at 308) the NPD(s) from the print driver store 300, and locally installs the NPD(s) at the agent side to complete the instantiation of the corresponding virtual printer(s) and to enable such virtual printers to receive and process print jobs from the virtual desktop.

Therefore, using the process/method described above, most print jobs become NPD-based print jobs. As such, the client and agent are able to leverage the richer print output and other benefits associated with using NPD(s), instead of having to rely more on UPDs.

There may be situations that are encountered wherein the agent is unable to find the required NPD(s) from the print driver store 300. In such situations, the agent can generate (or otherwise obtain) a UPD for the printers. For example, the agent can still instantiate the virtual printer(s), and can use the UPD for such virtual printer(s) that do not have NPD(s) locally installed at the agent side. In some embodiments, the agent can repeatedly check the print driver store 300 for updates to determine if the required NPD(s) have been stored in the print driver store 300, prior to using the UPD for the print job(s). The agent in some embodiments may also query the client, the management server 142, and/or some other entity to request that the NPD(s) be placed in the print driver store 300. These actions by the agent increase the opportunities for NPDs to be placed in the print driver store 300 for subsequent download and installation by the agent, before the agent ultimately needs to complete a print job using a UPD.

According to some embodiments, a utility or other tool may be provided at the client side (e.g., installed in the user device 146) that prompts the user to upload NPDs (shown at 302 in FIG. 3) to the print driver store. This prompting may be performed, for example, when the user device 146 logs into the virtualized computing environment 100 (such as when connecting to a host).

Figure 4:
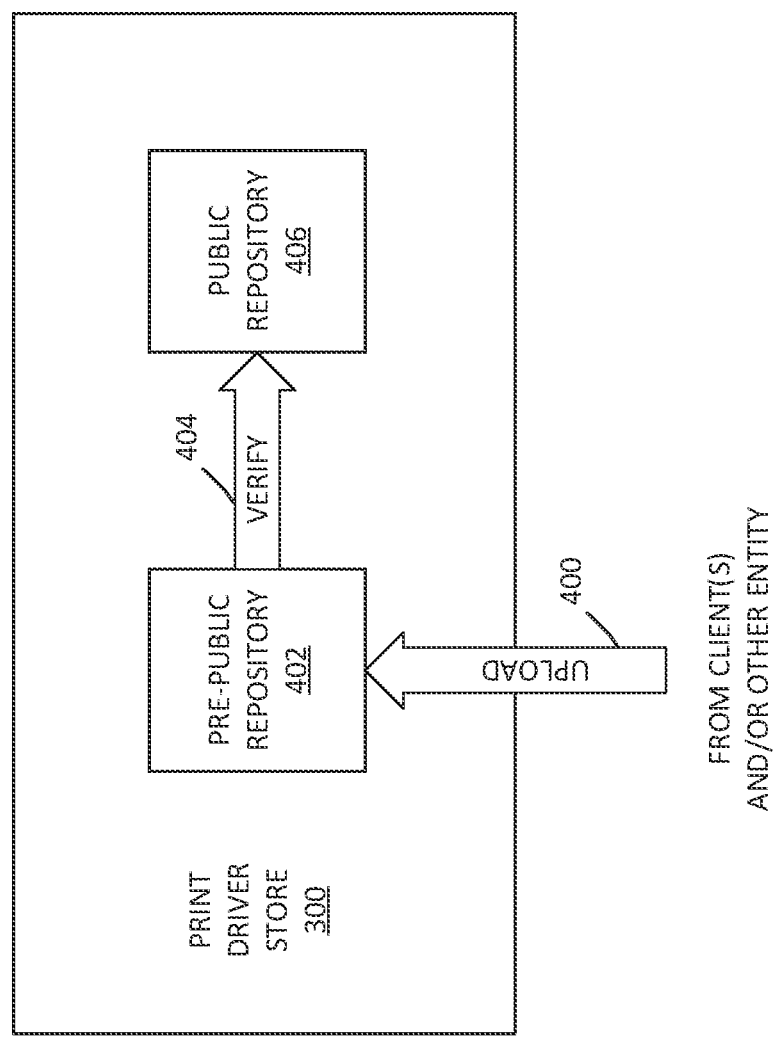
FIG. 4 is a diagram illustrating an example upload process for print drivers.

Such uploading process may involve at least two stages in some embodiments. FIG. 4 is a diagram illustrating an example upload process for print drivers that may be used by the elements shown in FIGS. 1-3.

First, if the user agrees to upload one or more NPDs to the print driver store 300, then the NPD(s) may be uploaded (shown at 400) to a first repository 402. The first repository 402 may be a pre-public repository located at the print driver store 300 or located elsewhere. FIG. 4 depicts an implementation wherein the first repository 402 is located at the print driver store 300. The first repository 402 may be a secure storage location or other type of storage location with limited access rights, such as access privileges that enable entities to upload NPDs but limit the capability of these or other entities to view, edit, download, or otherwise subsequently access the uploaded NPDs. The uploading at 400 to the first repository 402 may be performed by the client device 146 of the user, by the management server 142, by a vendor or manufacturer of NPDs, and/or by some other entity.

At the first repository 402, a system administrator or other entity with more extensive access rights to the uploaded NPD(s) can use tools to verify (shown at 404) the uploaded NPD(s) to: determine whether the NPD(s) operate properly, check whether the NPD(s) are genuine (e.g., pass signature and other authentication requirements), whether the whether the NPD(s) do not include malicious code such as viruses, or other operations to validate the NPD(s). This verification at 404 by the system administrator can be performed on the contents of the first repository 402 in periodic/repeated manner, so as to timely process NPDs as they are uploaded to the first repository over time.

If the NPDs are verified/validated at 402, then the NPDs are moved to a second repository 406, which may be a public repository located at the print driver store 300. The second repository 406 may be public in a sense that the NPDs stored therein are indexed and searchable by authorized entities, such as VMs, hosts, and other devices that are granted privileges to access, search, and download copies of the NPDs stored in the second repository 406. These access privileges may be limited as appropriate, for instance, if only authorized users (rather than the general public) are the persons requiring access to the NPDs.

FIG. 5 is a flowchart of an example method 500 to use the print driver store 300 to provide print drivers to an agent associated with a virtual desktop at the agent side of the virtualized computing environment 100 of FIG. 1. Example method 500 may include one or more operations, functions, or actions illustrated by one or more blocks, such as blocks 502 to 518. The various blocks of the method 500 and/or of any other process(es) described herein may be combined into fewer blocks, divided into additional blocks, supplemented with further blocks, and/or eliminated based upon the desired implementation. In one embodiment, the operations of the method 500 and/or of any other process(es) described herein may be performed in a pipelined sequential manner. In other embodiments, some operations may be performed out-of-order, in parallel, etc.

According to one embodiment, the method 500 may be performed by the agent side elements shown in FIGS. 1-4, in cooperation with the user device 146 and its client side elements shown in FIGS. 1-4. In other embodiments, various other elements in a computing environment may perform, individually or cooperatively, the various operations of the method 500.

At a block 502 ("RECEIVE PRINTER INFORMATION THAT IDENTIFIES A PHYSICAL PRINTER AT THE CLIENT SIDE"), the agent receives printer information from the client, such as via the VDI connection 208 when a VDI session is established between the client and the agent. The print information identifies/provides, among other things, the physical printer(s) that are coupled to the client at the client side.

The block 502 may be followed by a block 504 ("DETERMINE WHETHER A NATIVE PRINT DRIVER FOR THE PHYSICAL PRINTER IS LOCALLY INSTALLED AT THE AGENT SIDE"), wherein the agent checks local storage to determine whether a native print driver, associated with the physical printer, is locally installed. The block 504 may be followed by a decision block 506 ("LOCALLY INSTALLED?").

If the agent determines that the native print driver is locally installed ("YES" at the block 506), then the agent instantiates a virtual printer at the agent side that corresponds to the physical printer at the client side, at a block 508 ("INSTANTIATE A VIRTUAL PRINTER AT THE AGENT SIDE AND ASSOCIATE THE NATIVE PRINT DRIVER WITH THE VIRTUAL PRINTER"). The agent associates the locally installed native print driver with the virtual printer at the block 508, and the virtual printer is thereafter enabled for receiving print jobs from the virtual desktop.

If, however, the agent determines that the native printer is not locally installed at the agent side ("NO" at the block 506), then the agent searches for the missing native print driver at the print driver store 300, at a block 510 ("SEARCH THE PRINT DRIVER STORE FOR THE NATIVE PRINT DRIVER"). The block 510 may be followed by a decision block 512 ("LOCATED AT PRINT DRIVER STORE?").

If the agent fails to locate the native print driver at the print driver store ("NO" at the block 512), then the agent instantiates the virtual printer at the agent side and associates a universal print driver with the virtual printer, at a block 514 ("INSTANTIATE A VIRTUAL PRINTER AT THE AGENT SIDE AND ASSOCIATE A UNIVERSAL PRINT DRIVER WITH THE VIRTUAL PRINTER"). The agent may generate the universal print driver at the block 514, or the universal print driver may already be installed at the agent side.

If, however, the agent locates the native print driver at the print driver store 300 ("YES" at the block 512), then the agent obtains the native print driver from the print driver store, at a block 516 ("OBTAIN NATIVE PRINT DRIVER FROM PRINT DRIVER STORE"). For instance, the agent may download a copy of the native print driver from the print driver store 300.

The block 516 may be followed by a block 518 ("INSTALL THE OBTAINED NATIVE PRINT DRIVER AT THE AGENT SIDE"), wherein the agent installs the native print driver (obtained from the print driver store 300) at the agent side. After such installation, the agent is thereafter able to complete the instantiation of the virtual printer corresponding to the native print driver, including associating the native print driver to the virtual printer, at the block 508. Thereafter, the virtual printer is enabled to receive a print job issued from the virtual desktop, wherein the native print driver can be used by the agent to generate print data that can be passed directly to the physical printer at the client side for printing.

Computing Device

The above examples can be implemented by hardware (including hardware logic circuitry), software or firmware or a combination thereof. The above examples may be implemented by any suitable computing device, computer system, etc. The computing device may include processor(s), memory unit(s) and physical NIC(s) that may communicate with each other via a communication bus, etc. The computing device may include a non-transitory computer-readable medium having stored thereon instructions or program code that, in response to execution by the processor, cause the processor to perform processes described herein with reference to FIGS. 1-5. For example, computing devices capable of acting as agent-side host devices or client-side user devices may be deployed in or otherwise operate in conjunction with the virtualized computing environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

Although examples of the present disclosure refer to "virtual machines," it should be understood that a virtual machine running within a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances (VCIs) may include containers (e.g., running on top of a host operating system without the need for a hypervisor or separate operating system; or implemented as an operating system level virtualization), virtual private servers, client computers, etc. The virtual machines may also be complete computation environments, containing virtual equivalents of the hardware and system software components of a physical computing system. Moreover, some embodiments may be implemented in other types of computing environments (which may not necessarily involve a virtualized computing environment), wherein it would be beneficial to make native print drivers more readily available for printing.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood that each function and/or operation within such block diagrams, flowcharts, or examples can be implemented, individually and/or collectively, by a wide range of hardware, software, firmware, or any combination thereof.

Some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware are possible in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. The units in the device in the examples can be arranged in the device in the examples as described, or can be alternatively located in one or more devices different from that in the examples. The units in the examples described can be combined into one module or further divided into a plurality of sub-units.

We claim:

1. A method to use a print driver store to provide print drivers to a host device that runs a virtual desktop in a virtualized computing environment, the method comprising:
   receiving, by the host device from a client device when a virtual desktop infrastructure (VDI) connection for a VDI session is established between the client device and the host device, printer information that identifies a physical printer coupled to the client device, wherein a native print driver for the physical printer is installed at the client device;
   determining, by the host device, whether the native print driver for the physical printer is locally installed at the host device;
   in response to determining that the native print driver is missing from the host device and in response to unavailability of an installer kit, at the client device for the native print driver, which causes the native print driver to be unable to be installed at the host device by being provided from the client device, searching, by the host device, the print driver store for the native print driver;
   in response to locating, by the host device, the native print driver in the print driver store, obtaining, by the host device, the native print driver from the print driver store and installing, at the host device, the native print driver obtained from the print driver store; and
   instantiating at the host device, by the host device, a virtual printer corresponding to the physical printer and associating the installed native print driver obtained from the print driver store with the virtual printer.

2. The method of claim 1, further comprising:
   in response to failing to locate the native print driver in the print driver store, associating, by the host device, a universal print driver at the host device with the virtual printer; and
   in response to determining that the native print driver is locally installed at the host device, associating, by the host device, the locally installed native print driver with the virtual printer rather than searching for the native print driver in the print driver store.

3. The method of claim 1, wherein at least one entity, including the client device, uploads native print drivers to the print driver store for storage therein.

4. The method of claim 3, wherein:
   the upload of the native print drivers to the print driver store includes first and second stages,
   the first stage includes the at least one entity uploading at least one native print driver to a first repository, and
   the second stage includes verification of the at least one native print driver uploaded by the at least one entity, and storage of the at least one native print driver in a second repository, in the print driver store, in response to the at least one native print driver having passed the verification.

5. The method of claim 4, wherein the first repository is a pre-public repository with limited access privileges, and wherein the second repository is a public repository.

6. The method of claim 1, wherein the native print driver is persistently stored at the host device after installation, including remaining persistent after the virtual printer is deleted.

7. The method of claim 1, further comprising:
   in response to determining that the native print driver is installed at the client device and is usable at the host device:
      receiving, by the host device from the client device, at least one print driver file corresponding to the native print driver installed at the client device;
      installing at the host device by using the at least one print driver file, by the host device, the native print driver;
      instantiating at the host device, by the host device, the virtual printer corresponding to the physical printer, and associating the native print driver installed using the at least one print driver file received from the client device with the virtual printer; and
      using, by the host device, the native print driver installed using the at least one print driver file received from the client device to generate print data from a print job issued from the virtual desktop so as to enable the print data to be directly passed to the physical printer coupled to the client device for printing.

8. A non-transitory computer-readable medium having instructions stored thereon, which in response to execution by one or more processors, cause the one or more processors to perform a method to use a print driver store to provide print drivers to a host device that runs a virtual desktop in a virtualized computing environment, wherein the method comprises:
   receiving, by the host device from a client device, printer information that identifies a physical printer coupled to the client device;

determining, by the host device, whether a native print driver for the physical printer is locally installed at the host device;

in response to determining that the native print driver is missing from the host device:

searching, by the host device, the print driver store for the native print driver;

in response to locating, by the host device, the native print driver in the print driver store, obtaining, by the host device, the native print driver from the print driver store and installing, at the host device, the native print driver obtained from the print driver store; and instantiating at the host device, by the host device, a virtual printer corresponding to the physical printer and associating the installed native print driver obtained from the print driver store with the virtual printer; and in response to determining that the native print driver is installed at the client device and is usable at the host device:

receiving, by the host device from the client device, at least one print driver file corresponding to the native print driver installed at the client device;

installing at the host device by using the at least one print driver file, by the host device, the native print driver; and instantiating at the host device, by the host device, the virtual printer corresponding to the physical printer, and associating the native print driver installed using the at least one print driver file received from the client device with the virtual printer.

9. The non-transitory computer-readable medium of claim 8, wherein the method further comprises:

in response to failing to locate the native print driver in the print driver store, associating, by the host device, a universal print driver at the host device with the virtual printer.

10. The non-transitory computer-readable medium of claim 8, wherein at least one entity, including the client device, uploads native print drivers to the print driver store for storage therein.

11. The non-transitory computer-readable medium of claim 10, wherein:

the upload of the native print drivers to the print driver store includes first and second stages, the first stage includes the at least one entity uploading at least one native print driver to a first repository, and the second stage includes verification of the at least one native print driver uploaded by the at least one entity, and storage of the at least one native print driver in a second repository, in the print driver store, in response to the at least one native print driver having passed the verification.

12. The non-transitory computer-readable medium of claim 11, wherein the first repository is a pre-public repository with limited access privileges, and wherein the second repository is a public repository.

13. The non-transitory computer-readable medium of claim 8, wherein at least one of the native print driver obtained from the print driver store or the native print driver installed using the at least one print driver file received from the client device is persistently stored at the host device after installation, including remaining persistent after the virtual printer is deleted.

14. The non-transitory computer-readable medium of claim 8, wherein the method further comprises:

using, by the host device, the native print driver installed using the at least one print driver file received from the client device to generate print data from a print job issued from the virtual desktop so as to enable the print data to be directly passed to the physical printer coupled to the client device for printing.

15. A host device in a virtualized computing environment, the host device comprising:

one or more processors; and a non-transitory computer-readable medium having instructions stored thereon, which in response to execution by the one or more processors, cause the one or more processors to perform operations to use a print driver store to provide print drivers to the host device which runs a virtual desktop in the virtualized computing environment, wherein the operations comprise:

receive, by the host device from a client device at a client side when a virtual desktop infrastructure (VDI) connection for a VDI session is established between the client device and the host device, printer information that identifies a physical printer coupled to the client device, wherein a native print driver for the physical printer is installed at the client device;

determine, by the host device, whether the native print driver for the physical printer is locally installed at the host device;

in response to determination that the native print driver is missing from the host device and in response to unavailability of an installer kit, at the client device for the native print driver, which causes the native print driver to be unable to be installed at the host device by being provided from the client device, search, by the host device, the print driver store for the native print driver;

in response to locating, by the host device, the native print driver in the print driver store, obtain, by the host device, the native print driver from the print driver store and install, at the host device, the native print driver obtained from the print driver store; and instantiate at the host device, by the host device, a virtual printer corresponding to the physical printer and associate the installed native print driver obtained from the print driver store with the virtual printer.

16. The host device of claim 15, wherein the operations further comprise:

in response to a failure to locate the native print driver in the print driver store, associate, by the host device, a universal print driver at the host device with the virtual printer; and in response to determination that the native print driver is locally installed at the host device, associate, by the host device, the locally installed native print driver with the virtual printer rather than search for the native print driver in the print driver store.

17. The host device of claim 15, wherein at least one entity, including the client device, uploads native print drivers to the print driver store for storage therein.

18. The host device of claim 17, wherein:

the upload of the native print drivers to the print driver store includes first and second stages, the first stage includes the at least one entity uploading at least one native print driver to a first repository, and the second stage includes verification of the at least one native print driver uploaded by the at least one entity, and storage of the at least one native print driver in a second repository, in the print driver store, in response to the at least one native print driver having passed the verification.

19. The host device of claim 18, wherein the first repository is a pre-public repository with limited access privileges, and wherein the second repository is a public repository.

20. The host device of claim 15, wherein the native print driver is persistently stored at the host device after installation, including remaining persistent after the virtual printer is deleted.

21. The host device of claim 15, wherein the operations further comprise:
   in response to determination that the native print driver is installed at the client device and is usable at the host device:
      receive, by the host device from the client device, at least one print driver file corresponding to the native print driver installed at the client device;
      install at the host device by using the at least one print driver file, by the host device, the native print driver;
      instantiate at the host device, by the host device, the virtual printer corresponding to the physical printer, and associate the native print driver installed using the at least one print driver file received from the client device with the virtual printer; and
      use, by the host device, the native print driver installed using the at least one print driver file received from the client device to generate print data from a print job issued from the virtual desktop so as to enable the print data to be directly passed to the physical printer coupled to the client device for printing.

* * * * *